United States Patent [19]
Thorne

[11] Patent Number: 5,910,719
[45] Date of Patent: Jun. 8, 1999

[54] TOOL CENTER POINT CALIBRATION FOR SPOT WELDING GUNS

[75] Inventor: Henry F. Thorne, Pittsburgh, Pa.

[73] Assignee: Cycle Time Corporation, Pittsburgh, Pa.

[21] Appl. No.: 08/718,628

[22] Filed: Sep. 17, 1996

[51] Int. Cl.[6] .................................................. G05B 11/01
[52] U.S. Cl. ............................................................ 318/560
[58] Field of Search ..................................... 318/560–567, 318/569–580; 395/80–90; 367/906; 250/561; 356/375; 118/712, 323, 669

[56] References Cited

U.S. PATENT DOCUMENTS

| | | | |
|---|---|---|---|
| 4,662,752 | 5/1987 | Tucker et al. | 356/375 |
| 4,841,762 | 6/1989 | Hunter | 73/1 |
| 4,894,788 | 1/1990 | Stelzer | 364/513 |
| 5,119,759 | 6/1992 | Hicks | 118/712 |
| 5,177,563 | 1/1993 | Everett et al. | 356/375 |
| 5,194,792 | 3/1993 | Hara | 318/568.13 |
| 5,457,367 | 10/1995 | Thorne | 318/568.11 |

OTHER PUBLICATIONS

Henry F. Thorne, *Robotics Today*, Fourth quarter 1989, vol. 2, No. 4, "Robotic Arc Welding in a Flash".
Al B. Knasinski et al., "Robot Calibration & Off–Line Programming, An Industrial Solution", Feb. 1993.
Mikael Eriksson, "Determination of Tool Centre Points", pp. 4–8, 21, 22, 33–37, 43–55, 67, 71, 82 and 83.

*Primary Examiner*—William M. Shoop, Jr.
*Assistant Examiner*—Kim Lockett
*Attorney, Agent, or Firm*—Webb Ziesenheim Logsdon Orkin & Hanson, P.C.

[57] ABSTRACT

A method for tool calibration for a robotic tool includes providing a calibration device within a robot envelope. The calibration device includes a calibrating member positioned along a calibrating plane. The tool tip of the robotic tool is positioned to an initial position within the calibrating plane and position values of the robot face plate are obtained. The tool tip is rotated about the estimated or prior tool center point, the tool tip is again positioned within the calibrating plane, and further position values of the robot face plate are obtained. The actual tool center point is calculated from the obtained position values.

15 Claims, 1 Drawing Sheet

TOOL CENTER POINT CALIBRATION FOR SPOT WELDING GUNS

BACKGROUND OF THE INVENTION

1. Field of the Invention

The present invention relates to a tool center point calibration method for accurately determining appropriate tool center points for a robot to allow for proper tool alignment and correction of robot programs.

2. Prior Art

A tool center point is a six-dimensional vector defining the tool tip position of a robotic tool with respect to a robot face plate. The tool center point is essential so that the robot knows precisely where the tool is located. Although a robot will know the precise location of the robot face plate at any given time, a robot may not precisely know the tool center point for a specific tool due to a variety of reasons. For example, the tool center point for any specific tool of a given tool type will vary between the individual tools of that type. Consequently, pre-specified tool center points are not entirely accurate for any specific individual tool of a tool type. Additionally, the center point may change due to a crash or due to wearing of the tool. The robot, however, requires precise location of the tool center point for appropriate operation. For example, in a spot welding gun, an error in the plane of the workpiece where the robot believes the actual tool center point is will result in a corresponding error in the positioning of the spot welds by the robot on the workpiece.

Consequently, methods of determining the tool center point provide for correcting a robot program if the tool position changes due to a crash, tool change or other extraneous factors.

One known method for determining a tool center point is physically measuring the location and orientation of the tool with respect to the robot face plate and entering the measured tool center point. Subsequent to entering the initially measured tool center point, the gun is swiveled about the position assumed to be the tool center point. If the tip of the tool moves, the assumed center point is adjusted. When the tip of the tool does not move when pivoted about the assumed tool center point, the appropriate tool center point has been achieved. This procedure takes approximately 15 minutes for a skilled technician and has an accuracy of about ±8 mm. This particular method requires a skilled technician, a significant amount of downtime for a robot and only offers a minimal amount of accuracy.

Another method for calculating or updating a tool center point for robotic tools utilizes a fixed target or bull's-eye in a precise location. The robot arm is moved to a known target location and the tool is adjusted until the tool is appropriately aligned with the target. This procedure, again, requires a skilled technician and takes approximately 10 minutes. The accuracy of the resulting calculated tool center point is within approximately ±2 mm. The difficulty with this solution is that it requires a skilled technician and is time-consuming.

A further prior art method for determining or updating a tool center point involves removing the tool from the robot and moving the robot face plate to a fixed, known position, remounting the tool and taking the tips to the same known position. This removal and remounting of the tool can take 20 minutes and offers an accuracy of ±3 mm. Additionally, I have designed a double beam calibration unit specifically for the calibration of arc welding units. My prior art method is described in the article "Robotic Arc Welding in a Flash" in *Robotics Today*, Vol. 2, Number 4, Fourth Quarter 1989. The difficulties of my prior system are that it requires a pair of orthogonal beams and is limited to calibrating specific types of robotic tools.

SUMMARY OF THE INVENTION

The objects of the present invention are to overcome the disadvantages of the prior art systems and to provide an efficient method for determining the changes of a tool center point of robotic tools. A further object of the present invention is to provide a method for calibrating spot welding guns for robotic tools.

The objects of the present invention are achieved by a method of tool calibration for a robotic tool which includes providing a calibration device within the robot envelope wherein the calibration device includes a calibrating member positioned along a calibrating plane. The tool tip of the robotic tool is positioned to an initial position within the calibrating plane, and values of the robot face plate are obtained with the tool tip at the initial position within the calibrating plane. The tool tip is rotated about an estimated or prior tool center point to at least a second position, and the tool tip is again positioned within the calibrating plane. Additional values of the robot face plate with the tool tip in the calibrating plane are obtained, and a revised tool center point is calculated based upon all of the obtained values. The robotic tool may be aligned based upon the calculated tool center point. The robot can also automatically adjust the movement of the tool in operation to account for the revised tool center point.

In one embodiment of my invention, the calibration device having the calibrating member positioned along a calibrating plane is formed by the workpiece upon which the robotic tool is operating. Additionally, the method of tool calibration of my invention is particularly well adapted for spot welding guns.

These and other objects of the present invention will be clarified in the description of the preferred embodiments taken in connection with the attached drawings.

BRIEF DESCRIPTION OF THE PREFERRED EMBODIMENTS

My prior U.S. Pat. No. 5,457,367 discloses a tool center point calibration apparatus and method which provides a very accurate method for determining the tool center point of a robotic tool. The tool center point calibration apparatus and method described in my U.S. Pat. No. 5,457,367, which is incorporated herein by reference, is an effective primary calibration system. The method for calibrating robotic tool center points, according to my present invention, is preferably a supplemental calibration system effectively supplementing a primary calibration system such as described in my U.S. Pat. No. 5,457,367.

The method for calibrating a robotic tool center point according to my present invention calculates a change or error in the prior or assumed tool center point and would generally most effectively be utilized after a crash during a production cycle. Although intended to be a supplemental robotic tool calibration system, the present invention may be used as a primary calibration system for a robot.

The calibration of a robotic tool center point according to my present invention relies on the center point touching or breaking a calibrating plane 5 in space as shown in the figures. Preferably, touch sensing is utilized to touch the plane 5. With touch sensing, the calibrating plane 5 can be formed as a planar part of the workpiece upon which the robot is working. For example, in a spot welding robot used for welding sheet metal of a car, a planar portion of the sheet metal can be utilized to form the calibrating plane 5 for the method of my present invention. The calibration method of my invention would generally only require a ½ inch square area of the plane 5 such that only a small portion of the sheet metal workpiece need be planar. It is believed that most spot welding equipment already has touch sensing options available.

Existing touch sensing or touch down options for spot welding robots typically sense current passing from one electrode to the other. Consequently, if a portion of the workpiece, such as sheet metal of a car, forms the calibrating plane 5, the only hardware to be added to a spot welding robot using the calibration method of my invention would be an alligator clip from the non-fixed electrode of the spot welder to the workpiece forming the calibrating plane 5. A touch down sensor will detect contact between the fixed tip and the calibrating plane 5 portion of the workpiece to which the alligator clip is clipped due to a completion of the circuit.

Alternatively, a separate calibration device may be constructed in which a number of parallel or intersecting beams forms the calibrating plane 5 wherein the calibration device indicates when the calibrating plane 5 is broken. The calibrating plane 5 may be formed in any manner using existing sensors which indicate when the tool tip touches or breaks the plane 5.

Figure 1:
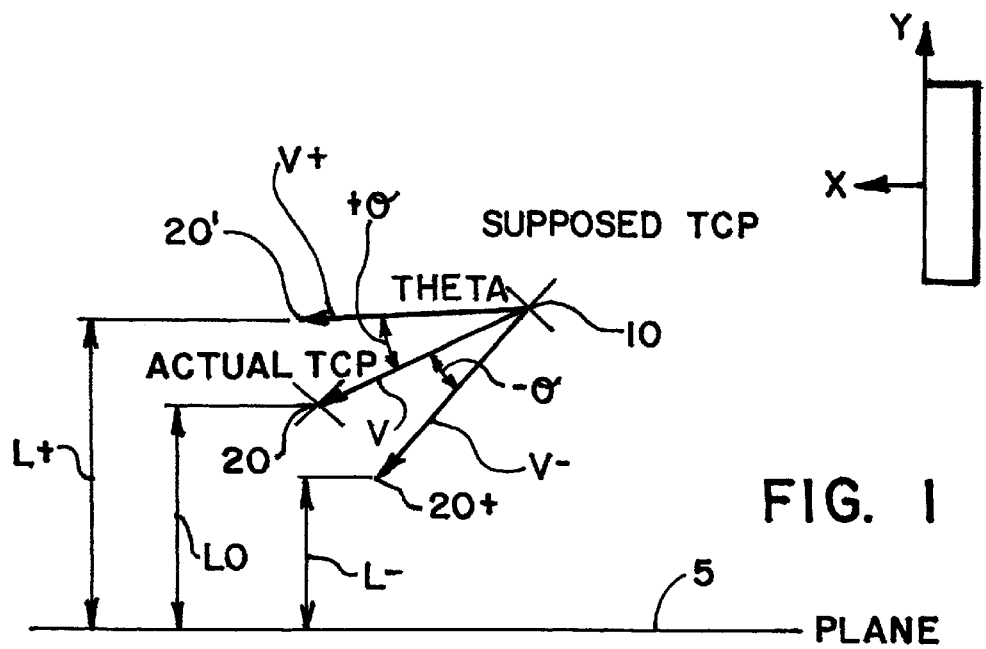
FIG. 1 schematically illustrates a method for calibrating robotic tool center points according to a first embodiment of my invention.

FIG. 1 schematically illustrates a method for calibrating the change in a robotic tool center point in two dimensions according to a first embodiment of my present invention. In the example illustrated in FIG. 1, the robot is utilizing a prior or estimated tool center point 10. The prior tool center point 10 represents the tool center point previously calculated before a crash or before a change of the tool tip. The prior tool center point 10 generally represents the previously calculated tool center point for the robotic tool. Alternatively, the prior tool center point 10 may represent an initial estimation of the tool center point, particularly where my present invention is utilized as the primary or sole calibration system for a robotic tool. The actual tool center point 20 is shown in FIG. 1 spaced from the prior tool center point 10 by a vector V for illustrative purposes. The calculation of the magnitude of the Vx and Vy components of vector V allows for the calculation of the actual tool center point 20 in the two dimensions shown in FIG. 1. The vector component Vz (normal to FIG. 1) will also be needed to calculate the actual tool center point 20 in three-dimensional space.

The method according to the first embodiment of my present invention operates as follows. With the tool positioned over the calibrating plane 5, the tool is moved down until the tool tip touches or breaks the calibrating plane 5 and the distance L0 between the actual tool center point 20 and the calibrating plane 5 can be determined by a change in the value of the face plate between the original position and the position where the tool tip touches the calibrating plane 5.

The robot is returned to the starting position and the tool tip is rotated +θ° about the prior tool center point 10 around the Z axis (normal to FIG. 1), resulting in the movement of the actual tool center point 20 to position 20' illustrated in FIG. 1, along with vector V+ which has the same magnitude as vector V. The robotic tool is moved toward the calibrating plane 5 until the tool tip breaks or touches the calibrating plane 5, and the distance L+ is thereby determined by obtaining values of changes in the face plate position of the robot. The robot is then returned to the original position, and the robot is rotated −θ° from the original position about the prior tool center point 10 along the Z axis. This rotation will correspond to a movement of the actual tool center point 20 to the position 20* illustrated in FIG. 1 along with vector V−. The tool tip is moved down to break or touch the calibrating plane 5, and values of the face plate are obtained to measure distance L−.

It should be realized that if the actual tool center point 20 and the estimated or prior tool center point 10 were aligned, the vector V would be zero and distances L0, L+ and L− would all have the same values. From the illustration of FIG. 1, it should be clear that the following expression is satisfied:

$$L0+Vy=L+-Vx\sin\theta+Vy\cos\theta=L-+Vx\sin\theta+Vy\cos\theta$$

The foregoing equations represent the trigonometric equality that the height of the prior tool center point 10 above the calibrating plane 5 is the result of adding the calculated distance (L0, L+ or L−) plus the appropriate portions of the vector V. The mathematics of these equations is similar to the mathematics described in connection with FIG. 9 of my prior U.S. Pat. No. 5,457,367 which is incorporated herein by reference.

The vector components Vx and Vy of the vector V in the X-Y plane of FIG. 1 from the prior tool center point 10 to the position of the actual tool center point 20 can be calculated as follows:

$$Vx = \frac{L+-L-}{2\sin\theta}$$

$$Vy = \frac{L++L--2L0}{2-2\cos\theta}$$

As discussed above and as shown in the equations, if the distances L0, L+ and L− are equal, then the vector components Vx and Vy are zero. It is significant that, for small angles, an error in the measurement of the distances (L0, L+ and L−) far more greatly affects the measurement of Vy than Vx. Consequently, at small angles of rotation θ the error in the calculated Vx is acceptable whereas the error in the calculated Vy is not acceptable. For example, in a 1° rotation (i.e., where θ=1°) any error in the measurement of the distances is multiplied by 28.65 when calculating the Vx component, but is multiplied by an unacceptable value of 3282.89 when calculating Vy. The increase in over 100 times the error for calculating Vy makes this unacceptable. Large angles are required for achieving accurate measurements of Vy. However, in spot welding applications, the determination of Vx and Vz, which is normal to the illustration shown in FIG. 1, is the most significant. Accurate determinations of Vy would generally not be required in spot welding applications.

The process described above will be repeated with the rotations ±θ occurring about the X axis for determining the value for Vz. The mathematics of finding Vz is identical to finding Vx above and results in the same limitations for calculating Vy which is normal to the calibrating plane 5. Vy can actually be determined when greater angles of rotation θ are utilized. However, the available room required for tilting about the prior tool center point 10 may limit the maximum value of θ which can be effectively used. Additionally, for greater θ, a greater area of the calibrating plane 5 is utilized. If the calibrating plane 5 is being formed as a portion of the workpiece, this becomes significant since a larger area of the workpiece would be required to have a planar configuration when large angles are used.

In a spot welding robot using the method of my invention, it is anticipated that the robot program includes a statement prior to having the robot reach the first spot weld which will call the calibration software for operating the calibration method of my present invention if a specified signal is on. This signal would preferably be turned on by the user after a crash or other activating event. When the robot reaches the first spot in a calibration mode, it stops and asks the user to appropriately set up the calibration system. As discussed above, this will preferably require the user to install an alligator clip on or otherwise ground the sheet of metal of the workpiece which will generally have an accessible 0.5 inch×0.5 inch planar portion. Alternatively, another type of calibration device could be utilized which will indicate when the tool has touched or broken the calibrating plane 5. Preferably, the user will be prompted to assure that the gun tip will actually touch the flat part of the sheet metal which is forming the calibrating plane 5 if the tool moves down in the tip direction. If this is not the case, the user can physically move the gun tip until this condition is satisfied. The user can then press "GO" or otherwise instruct the process to proceed, and the software will automatically perform the above method with 1° rotations (both plus and minus) about the prior tool center point 10 around the two axes X and Z which are parallel to the calibrating plane 5. My present invention will then correct the tool center point in the X and Z directions only and not the third, the Y direction, which is the vector normal to the calibrating plane 5 since the error in this calculation is too great for small angles. My present invention, preferably, will start repeating the same measurements with an ever-increasing amount of swivel or degree of rotation θ with each time stopping to ask the user if the greater swivel or degree θ, which yields greater accuracy, is desired. The process of my present invention will become more accurate as the process is repeated, and the user can quit at any time. Additionally, if a certain amount of tilt angle θ is reached, for example 10°, my present invention will start calculating the vector component Vy normal to the calibrating plane 5 as well as according to the above equations. As noted above, Vy is very sensitive to measurement error when the angle is small so it is not worthwhile to calculate this value when the angle θ is small due to the high degree of error. Consequently, this calculation is delayed until the calculation of Vy is meaningful. However, as noted above, this calculation will not be essential for correcting the tool center point in spot welding robots since this is not critical for their operation. In general, an error of the tool center point location in a direction normal to the plane of the workpiece will not significantly affect the operation of the spot welding robots.

Figure 2A:
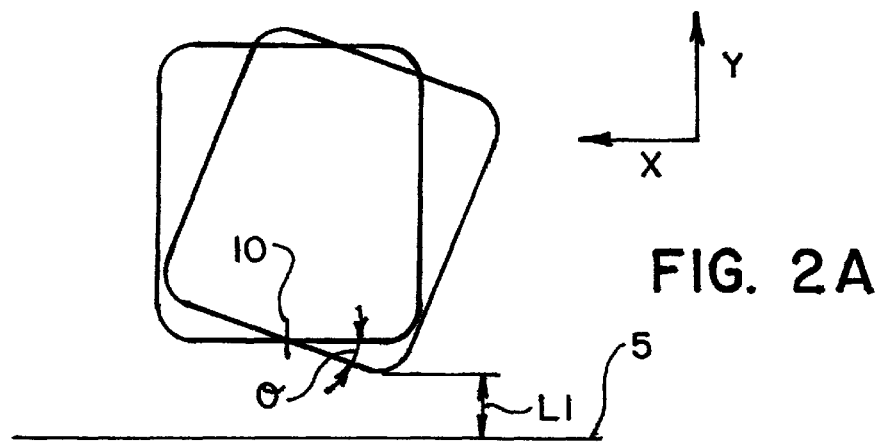
FIGS. 2A and 2B schematically illustrate a method for calibrating robotic tool center points according to a second embodiment of my invention.
Figure 2B:
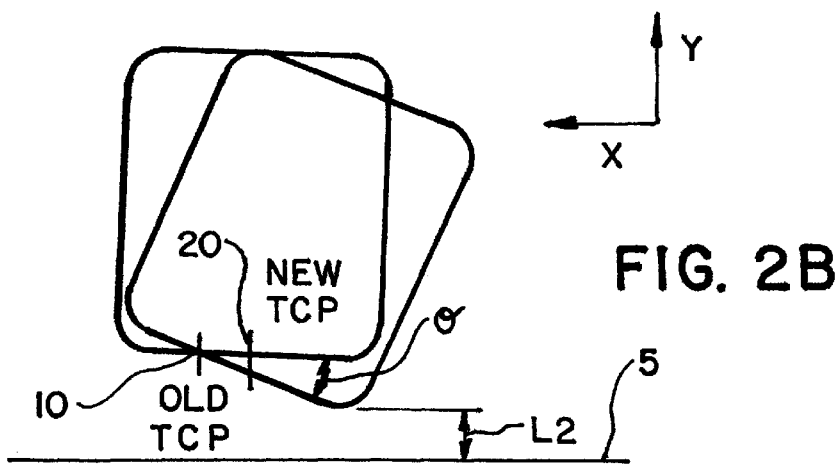

FIGS. 2A and 2B illustrate a separate calibration method for robotic tool center points according to my present invention. This method additionally utilizes a calibrating plane 5 which can be formed in the manner as described above. Preferably, the calibrating plane 5 is formed as a portion of the workpiece as described above.

According to the second embodiment of the present invention, once a tool center point 10 has been acceptably calculated, the tool tip (shown schematically in FIGS. 2A and 2B) is rotated an angle θ about the existing tool center point 10 around the Z axis which is moved to FIG. 2A. A distance L1 from the tool to the calibrating plane 5 is measured in this setup position. This distance L1 represents the distance between the tool and the calibrating plane 5 after rotation about the tool center point 10. This information is stored and utilized in subsequent calibration. To reiterate, the steps schematically illustrated in FIG. 2A are done prior to a crash or need for adjustment of the tool center point 10. When further calibration of the tool center point is required, such as after a crash, the gun is returned to the position above the calibrating plane 5 as shown in FIG. 2B. The gun is rotated about the prior tool center point 10 around the Z axis through an angle θ. The distance L2 is then measured. The distance to the actual tool center point 20 in the X direction is represented by the vector component Vx and is determined by the following calculation:

$$Vx = \frac{L1 - L2}{\sin\theta}$$

This process is repeated for determining the distance to the tool center point 20 in the Z direction, represented by vector component Vz, by repeating the process and rotating about the X axis. The process according to the second embodiment of my present invention is utilized to calculate the changes in the tool center point in the X and Z directions which are the directions parallel to the calibrating plane 5. The change in the tool center point in the direction normal to the calibrating plane 5 (vector component Vy) is not calculated. As discussed above, in spot welding applications, this dimension is not critical and is not needed for adjusting the tool center point position. The mathematics of this calculation is similar to that described in connection with FIG. 10 of my prior U.S. Pat. No. 5,457,367 which is incorporated herein by reference.

To reiterate, the method according to the second embodiment of my present invention requires that the measurement of the distance L1 for both the Vx and Vz calculations with the prior tool center point 10 be accurate (i.e., before a crash or change).

Both methods for tool calibration for a robotic tool according to the present invention include the steps of providing a calibration device within the robot envelope wherein the calibration device includes a calibrating member positioned along a calibrating plane 5. Preferably, the calibrating plane 5 is formed of a planar part of the workpiece upon which the robot is working. In both methods of my present invention, the tool tip is positioned to an initial position within the calibrating plane 5 wherein values of the face plate are obtained with the tool tip in the initial position. The touching of the tool tip to the calibrating plane 5 is considered "within" the plane for the purpose of this application. The tool is rotated about an estimated or prior tool center point 10 to at least a second position, and the tool tip is positioned within the calibrating plane 5. Additional values of the robot face plate with the tool tip within the calibrating plane 5 are obtained, and a revised actual tool center point 20 is calculated based upon all of the obtained values. The revised actual tool center point 20 preferably includes revisions in at least two directions parallel to the workpiece.

The tool may then be aligned based upon the revised calculated tool center point 20 or, alternatively, the robot can automatically adjust the movement of a tool in operation to account for the revised tool center point 20.

In the first embodiment of my present invention, the process can be repeated to obtain greater accuracy in the revised tool center point 20. Additionally, in the first embodiment of my present invention, the tool is rotated in a first direction by a given angle θ and then in a second direction by the same angle θ for the calculation of the change in the tool center point. This double rotation helps minimize errors due to nonsymmetrical tool tips.

The method of the tool center point calibration according to the second embodiment of the present invention does require initial measurements (L1 for both Vx and Vz calculations) with an accurate tool center point 10 before the tool center point is in need of correction (i.e., before a crash). However, the second embodiment of the present invention provides a very quick process for revising the tool center point position for the two critical dimensions parallel to the plane of the workpiece.

It will be obvious to those of ordinary skill in the art that various modifications and changes may be made to the present invention without departing from the spirit and scope thereof. Consequently, the scope of the present invention is intended to be defined by the attached claims.

What is claimed is:

1. A method for tool calibration for a robot with a face plate having a tool tip and tool tip axis, said tool tip movable by said robot within a robot envelope, said method comprising the steps of:
   a) providing a calibration means within the robot envelope, wherein said calibration means includes a calibrating member positioned along a calibrating plane;
   b) positioning said tool tip to an initial position within said calibrating plane;
   c) obtaining values of said robot face plate with said tool tip positioned within said calibrating plane;
   d) rotating said tool tip about an estimated tool center point in a first direction to at least a second position and positioning said tool tip within said calibrating plane;
   e) obtaining values of said robot face plate with said tool tip within said calibrating plane following said rotation to said second position; and
   f) calculating a tool center point based upon said obtained values.

2. The method of claim 1 wherein said robot is a spot welding robot.

3. The method of claim 2 wherein said calibrating member is formed by a workpiece to be worked on by said tool of said robot.

4. The method of claim 3 wherein said workpiece is sheet metal.

5. The method of claim 1 wherein said calibrating member is formed by a workpiece to be worked on by said tool of said robot.

6. The method of claim 5 wherein said workpiece is sheet metal.

7. The method of claim 1 wherein steps b) through e) are repeated and performed independently for each of two axes of said tool center point which are parallel to said calibrating plane.

8. The method of claim 7 wherein steps b) through f) are repeated with a greater angle of rotation.

9. The method of claim 1 further including the steps of rotating said tool tip about said estimated tool center point to a third position, positioning said tool tip within said calibrating plane and obtaining values of said face plate with said tool tip within said calibrating plane following said rotation to said third position.

10. The method of claim 9 wherein said rotation to said third position is in a second direction opposite to said first direction.

11. The method of claim 10 wherein said third position is rotationally offset from said first position an angle equal to an angle between said first position and said second position.

12. The method of claim 11 wherein steps b) through e) are repeated and performed independently for each of two axes of said tool center point which are parallel to said calibrating plane.

13. The method of claim 12 wherein steps b) through f) are repeated with a greater angle of rotation.

14. The method of claim 11 wherein said calibrating member is formed by a workpiece to be worked on by said tool of said robot.

15. The method of claim 14 wherein said robot is a spot welding robot.

* * * * *